(12) United States Patent
Hall

(10) Patent No.: US 8,248,466 B2
(45) Date of Patent: Aug. 21, 2012

(54) IMAGE PROCESSING USING MULTIPLE IMAGE DEVICES

(75) Inventor: Ezra Daniel Bernard Hall, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 1693 days.

(21) Appl. No.: 11/548,328

(22) Filed: Oct. 11, 2006

(65) Prior Publication Data

US 2008/0089653 A1    Apr. 17, 2008

(51) Int. Cl.
*H04N 7/18* (2006.01)
(52) U.S. Cl. .......................................... 348/77
(58) Field of Classification Search .............. 348/45, 348/61, 77, 78
See application file for complete search history.

(56) References Cited

U.S. PATENT DOCUMENTS

| | | | | |
|---|---|---|---|---|
| 4,745,470 A * | 5/1988 | Yabe et al. | ...................... | 348/76 |
| 6,198,866 B1 * | 3/2001 | Nikolaevich | .................. | 385/115 |
| 6,636,254 B1 * | 10/2003 | Onishi et al. | .................... | 348/65 |
| 6,654,046 B2 * | 11/2003 | Eccleshall | ........................ | 348/61 |
| 6,678,060 B2 * | 1/2004 | Heyworth | ...................... | 356/614 |
| 7,058,252 B2 * | 6/2006 | Woodgate et al. | .............. | 385/16 |
| 7,189,584 B2 * | 3/2007 | Kuo | ................................. | 438/7 |
| 7,554,572 B2 * | 6/2009 | Takahashi | ....................... | 348/65 |
| 2002/0057846 A1 * | 5/2002 | Saitou et al. | .................. | 382/274 |
| 2002/0067407 A1 * | 6/2002 | Cooper | ........................... | 348/66 |
| 2007/0015963 A1 * | 1/2007 | Fengler et al. | ............... | 600/109 |

* cited by examiner

*Primary Examiner* — Wing Chan
*Assistant Examiner* — Alicia Baturay
(74) *Attorney, Agent, or Firm* — Schmeiser, Olsen & Watts; Anthony J. Canale

(57) ABSTRACT

An apparatus and a method for operating the same. The apparatus includes N light guide portions. Each light guide portion of the N light guide portions includes a first light guide end and a second light guide end. If an image enters the N light guide portions through the N first light guide ends, then the image goes through the N light guide portions and exits through the N second light guide ends undistorted. The apparatus further includes N image devices. The N image devices are in one-to-one close proximity to the N second light guide ends. If an image exits the N light guide portions through the N second light guide ends, then the image essentially completely enters the N image devices.

16 Claims, 6 Drawing Sheets

IMAGE PROCESSING USING MULTIPLE IMAGE DEVICES

FIELD OF THE INVENTION

The present invention relates generally to image processing, and more particularly to image processing using multiple image devices.

BACKGROUND OF THE INVENTION

In digital image processing of the prior art, in order to increase the resolution of the image, the size of the image sensor chip has to be increased. However, increasing the size of the image sensor chip would decrease yield and dramatically increase fabrication costs. Therefore, there is a need for an apparatus (and a method for operating the same) in which image resolution (and/or overall image size) can be increased without increasing the individual image sensor chip size.

SUMMARY OF THE INVENTION

The present invention provides an apparatus, comprising (a) N light guide portions, wherein N is an integer greater than 1, wherein each light guide portion of the N light guide portions comprises a first light guide end and a second light guide end, wherein if an image enters the N light guide portions through the N first light guide ends, then the image goes through the N light guide portions and exits through the N second light guide ends undistorted; and (b) N image devices, wherein the N image devices are in one-to-one close proximity to the N second light guide ends, and wherein if an image exits the N light guide portions through the N second light guide ends, then the image essentially completely enters the N image devices.

The present invention provides an apparatus operation method, comprising providing an apparatus which includes (a) N light guide portions, wherein N is an integer greater than 1, wherein each light guide portion of the N light guide portions comprises a first light guide end and a second light guide end, wherein if an image enters the N light guide portions through the N first light guide ends, then the image goes through the N light guide portions and exits through the N second light guide ends undistorted; and (b) N image sensor devices, wherein the N image sensor devices are in one-to-one close proximity to the N second light guide ends, and wherein if an image exits the N light guide portions through the N second light guide ends, then the image essentially completely enters the N image sensor devices; sending an image to the N first light guide ends; splitting the image into N sub images into the N light guide portions; using the N light guide portions to transmit the N sub images to the N image sensor devices; and using the N image sensor devices to collect and convert the N sub images to N digital data.

The present invention provides an apparatus operation method, comprising providing an apparatus which includes (a) N light guide portions wherein N is an integer greater than 1, wherein each light guide portion of the N light guide portions comprises a first light guide end and a second light guide end, wherein if an image enters the N light guide portions through the N second light guide ends, then the image goes through the N light guide portions and exits through the N first light guide ends undistorted; and (b) N image display devices wherein the N image display devices are in one-to-one close proximity to the N second light guide ends, and wherein if an image exits the N image display devices, then the image goes to the N light guide portions through the N light guide ends; using the N image display devices to generate N sub images of a single image into the N light guide portions through the N second light guide ends; and using the N light guide portions to transmit the N sub images to the N first light guide ends.

The present invention provides an apparatus (and a method for operating the same) in which image resolution (and/or overall image size) can be increased without increasing the individual image sensor chip size.

DETAILED DESCRIPTION OF THE INVENTION

Figure 1:
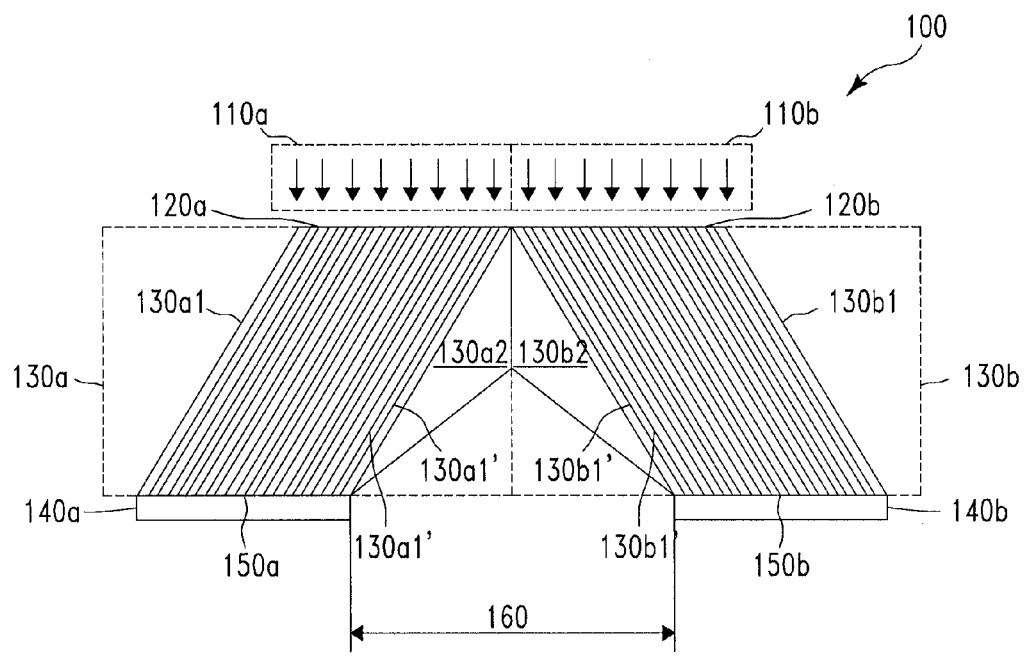
FIG. 1 shows a side view of a structure, in accordance with embodiments of the present invention.

FIG. 1 shows a side view of a structure 100, in accordance with embodiments of the present invention. More specifically, in one embodiment, with reference to FIG. 1, the structure 100 comprises (i) two fiber optic bundles 130*a* and 130*b* and (ii) two image sensor chips 140*a* and 140*b*. In one embodiment, the image sensor chips 140*a* and 140*b* are physically placed apart from each other. In one embodiment, a distance 160 between the image sensor chips 140*a* and 140*b* is large enough to ensure that there is enough space for logic circuits and bond pads (not shown) around the perimeters of the image sensor chips 140*a* and 140*b*. Illustratively, the fiber optic bundle 130*a* comprises a first light guide portion 130*a*1 and a first support portion 130*a*2.

Figure 1A:
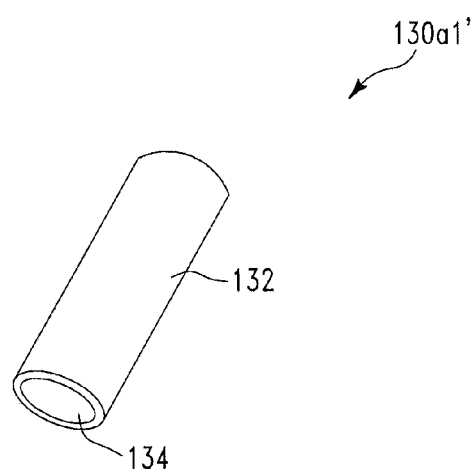
FIG. 1A shows a perspective view of a fiber optic element of the structure of FIG. 1, in accordance with embodiments of the present invention.

More specifically, in one embodiment, the first light guide portion 130*a*1 comprises multiple individual fiber optic elements 130*a*1'. Illustratively, each fiber optic element 130*a*1' comprises a core 134 and a cladding 132 (as shown in FIG. 1A). In one embodiment, the cladding 132 has a lower index of reflectivity than the core 134. As a result, it is difficult for light transmitting along the core 134 to escape the core 134 through the cladding 132.

In one embodiment, the fiber optic bundle 130*a* further comprises a light input end 120*a* and a light output end 150*a*. Illustratively, each individual fiber optic element 130*a*1' of the first light guide portion 130*a*1 comprises an element input end at the light input end 120*a* and an element output end at the light output end 150*a*. In one embodiment, each individual fiber optic element 130*a*1' of the first light guide portion 130*a*1 is bonded tightly and aligned with its neighboring elements such that each individual fiber optic element 130*a*1' is locked in relation to neighboring position so as to not distort the transmitted image. Illustratively, the image sensor chip 140a is placed in close proximity to the light output end 150a, meaning the image sensor chip 140a would receive essentially all of light emitting from the light output end 150a.

In one embodiment, the fiber optic bundle 130b comprises a second light guide portion 130b1 and a second support portion 130b2. Illustratively, the structures of the second light guide portion 130b1 and the second support portion 130b2 are similar to the structures of the first light guide portion 130a1 and the first support portion 130a2, respectively. In one embodiment, the fiber optic bundle 130b further comprises a light input end 120b and a light output end 150b. Illustratively, each individual fiber optic element 130b1' of the second light guide portion 130b1 comprises an element input end at the light input end 120b and an element output end at the light output end 150b. In one embodiment, each individual fiber optic element 130b1' of the second light guide portion 130b1 is bonded tightly and aligned with its neighboring elements such that each individual fiber optic element 13b1' is locked in relation to neighboring position so as to not distort the transmitted image. Illustratively, the image sensor chip 140b is placed in close proximity to the light output end 150b, meaning the image sensor chip 140b would receive essentially all of light emitting from the light output end 150b.

In one embodiment, the support portions 130a2 and 130b2 are bonded together so as to help hold the fiber optic bundles 130a and 130b tightly together. Illustratively, the support portions 130a2 and 130b2 can comprise any material and are not necessarily for transmitting light. In one embodiment, the light input ends 120a and 120b are adjacent and coplanar. Illustratively, the light output ends 150a and 150b are coplanar. In one embodiment, the light input ends 120a and 120b and the light output ends 150a and 150b are in parallel planes.

In one embodiment, the fiber optic bundles 130a and 130b can be formed from commercially available products. Illustratively, each of the fiber optic bundles 130a and 130b can be cut from a commercially available faceplate (not shown), or other commercially available coherent fiber bundle structures (not shown). In one embodiment, the faceplate is a bundle of fiber optic elements (similar to the fiber optic elements 130a1') which are bonded tightly together and aligned with one another so as to not distort the transmitted image. As a result, the support portions 130a2 and 130b2 also comprise fiber optic elements. However, the fiber optic elements (not shown) of the support portions 130a2 and 130b2 do not necessarily receive or transmit any light incident on the light input ends 120a and 120b.

Figure 2:
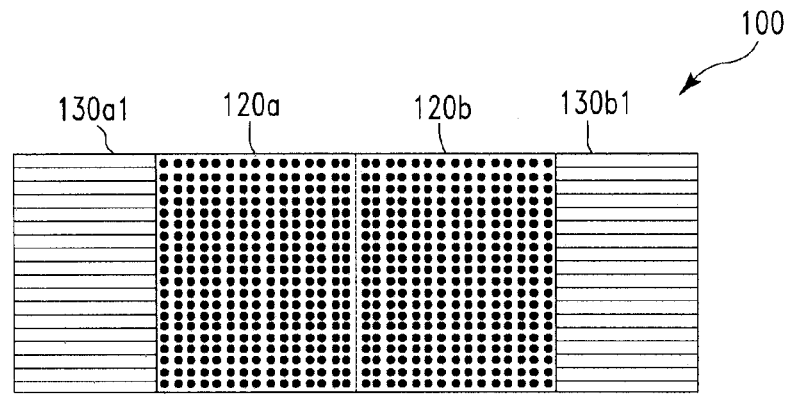
FIG. 2 shows a top-down view of the structure of FIG. 1, in accordance with embodiments of the present invention.

FIG. 2 shows a top-down view of the structure 100 of FIG. 1, in accordance with embodiments of the present invention.

With reference to FIGS. 1 and 2, in one embodiment, the operation of the structure 100 is as follows. In one embodiment, assume that light 110a comes from a first half of a single image (not shown) and is incident on the light input end 120a, whereas light 110b comes from a second half of the same image and is incident on the light input end 120b. As a result, the light 110a transmits along the fiber optic elements 130a1' to the light output end 150a and then to the image sensor chip 140a. There, the light 10a coming from the first half of the single image is converted to a first digital data. It should be noted that the first support portion 130a2 does not transmit any portion of the light 110a. Similarly, the light 110b transmits along the fiber optic elements 130b1' to the light output end 150b and then to the image sensor chip 140b. There, the light 110b coming from the second half of the single image is converted to a second digital data. It should be noted that the second support portion 130b2 does not transmit any portion of the light 110b. In one embodiment, the first digital data from the image sensor chip 140a and the second digital data from the image sensor chip 140b can be processed, combined, and then stored as a single data for the single image as if the lights 110a and 110b were collected and processed by a single image sensor chip.

In summary, the lights 110a and 110b coming from the single image are split in halves wherein the first half 110a transmits through the fiber optic bundle 130a and is collected and converted into the first digital data by the image sensor chip 140a and wherein the second half 110b transmits through the fiber optic bundle 130b and is collected and converted into the second digital data by the image sensor chip 140b. It should be noted that the first digital data from the image sensor chip 140a and the second digital data from the image sensor chip 140b can be processed, combined, and then stored as a single data for the single image as if the lights 110a and 110b were collected and processed by a single image sensor chip. As a result, the fiber optic bundles 130a and 130b can be collectively referred to as a coherent fiber optic image divider (CFOID) 130a+130b.

Figure 3:
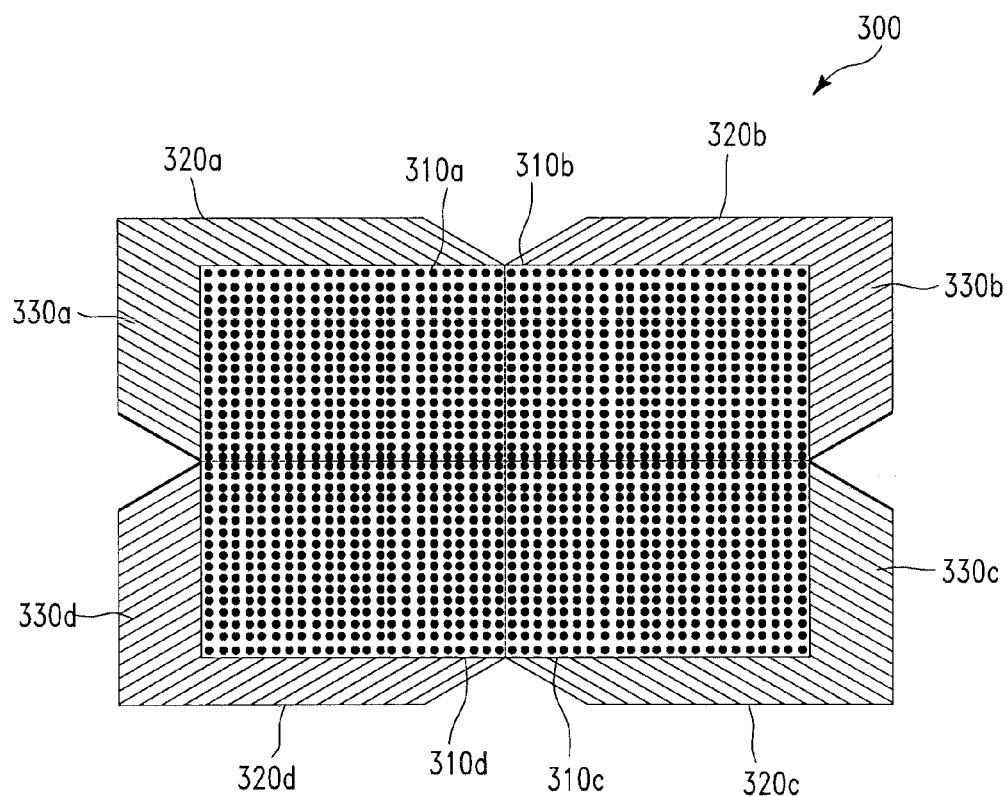
FIG. 3 shows a top-down view of a structure, in accordance with embodiments of the present invention.

FIG. 3 shows a top-down view of a structure 300, in accordance with embodiments of the present invention. More specifically, in one embodiment, the structure 300 comprises four fiber optic bundles 330a, 330b, 330c, and 330d. For illustration, the structure of each of the fiber optic bundles 330a, 330b, 330c, and 330d is similar to the structure of the fiber optic bundle 130a of FIG. 1. In one embodiment, light input ends 310a, 310b, 310c, and 310d of the fiber optic bundles 330a, 330b, 330c, and 330d, respectively, are adjacent to one another and coplanar. Illustratively, four image sensor chips (not shown) are placed in close proximity to light output ends 320a, 320b, 320c, and 320d of the fiber optic bundles 330a, 330b, 330c, and 330d, respectively, meaning the four image sensor chips would receive essentially all of lights emitting from the light output ends 320a, 320b, 320c, and 320d. In one embodiment, the light output ends 320a, 320b, 320c, and 320d are physically apart from one another such that there is enough space for logic circuits and bond pads (not shown) around the perimeters of the four image sensor chips. Illustratively, the light output ends 320a, 320b, 320c, and 320d are coplanar. In one embodiment, the light input ends 310a, 310b, 310c, and 310d and the light output ends 320a, 320b, 320c, and 320d are in parallel planes. The fiber optic bundles 330a, 330b, 330c, and 330d can be collectively referred to as a CFOID 330a+330b+330c+330d.

Figure 4:
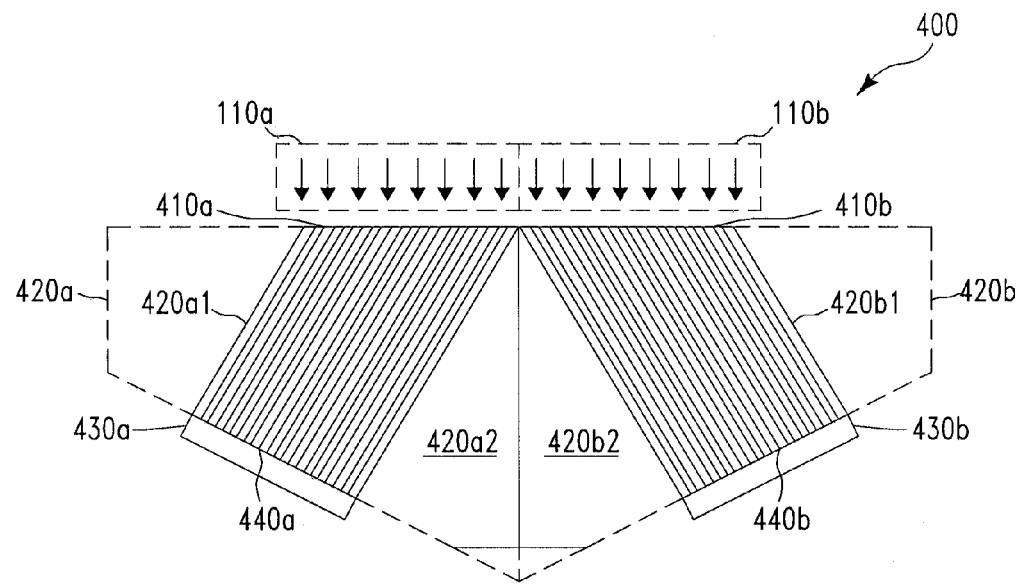
FIG. 4 shows a side view of a structure, in accordance with embodiments of the present invention.

FIG. 4 shows a side view of a structure 400, in accordance with embodiments of the present invention. More specifically, in one embodiment, the structure 400 comprises (i) two fiber optic bundles 420a and 420b and (ii) two image sensor chips 430a and 430b. For illustration, the structure of each of the fiber optic bundles 420a and 420b is similar to the structure of the fiber optic bundle 130a of FIG. 1 except that a light input end 410a and a light output end 440a of the fiber optic bundle 420a are not in parallel planes. In one embodiment, the orientation of fiber optic elements of the fiber optic bundles 420a is perpendicular to the plane of the light output end 440a. In one embodiment, light input ends 410a and 410b of the fiber optic bundles 420a and 420b, respectively, are adjacent and coplanar. Illustratively, the light output ends 440a and 440b of the fiber optic bundles 420a and 420b, respectively, are physically apart from each other such that there is enough space for logic circuits and bond pads (not shown) around the perimeters of the image sensor chips 430a and 430b.

In one embodiment, the operation of the structure 400 is similar to the operation of the structure 100 of FIG. 1. Therefore, the fiber optic bundles 420a and 420b can be collectively referred to as a CFOID 420a+420b.

Figure 5:
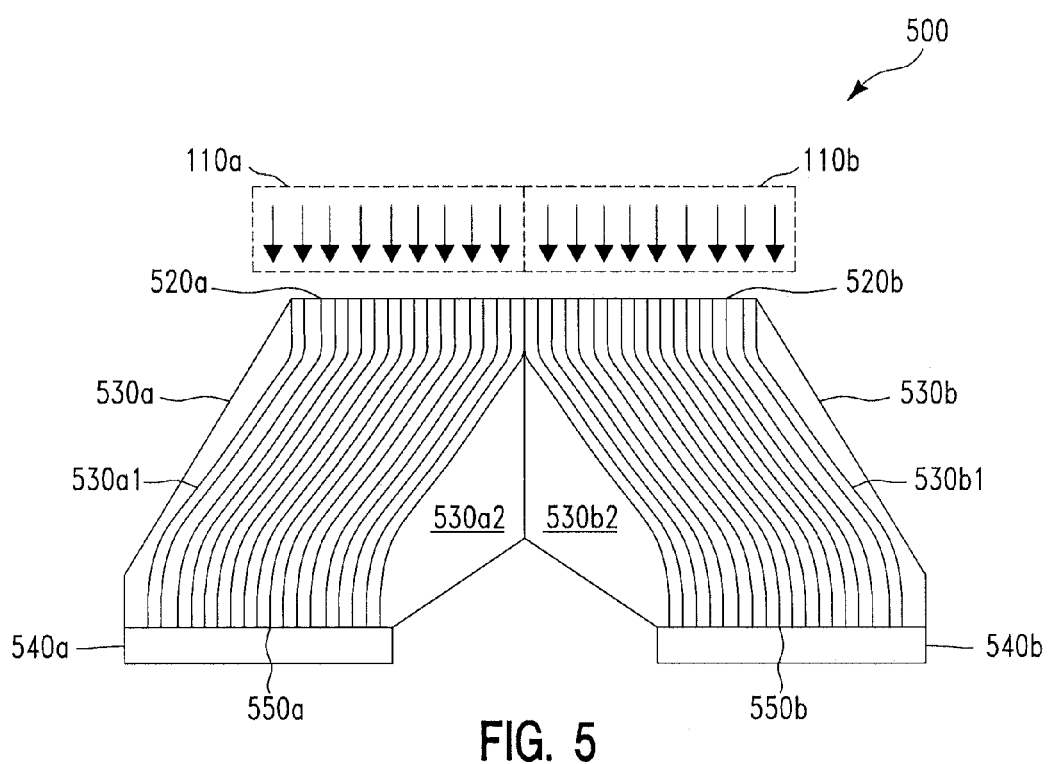
FIG. 5 shows a side view of a structure, in accordance with embodiments of the present invention.

FIG. 5 shows a side view of a structure 500, in accordance with embodiments of the present invention. More specifically, in one embodiment, the structure 500 comprises (i) two fiber optic bundles 530a and 530b and (ii) two image sensor chips 540a and 540b. For illustration, the structure of each of fiber optic bundles 530a and 530b is similar to the structure of the fiber optic bundle 130a of FIG. 1 except that each individual fiber optic element of the fiber optic bundles 530a and 530b is custom routed from light input ends 520a and 520b to light output ends 550a and 550b, respectively.

In one embodiment, the orientation of each fiber optic element of the fiber optic bundle 530a at its element input end is perpendicular to the light input end 520a. Similarly, the orientation of each fiber optic element of the fiber optic bundle 530b at its fiber optic element input end is perpendicular to the light input end 520b. Illustratively, the light input ends 520a and 520b of the fiber optic bundles 530a and 530b, respectively, are adjacent and coplanar. In one embodiment, the light output ends 550a and 550b are coplanar. In one embodiment, the light output ends 550a and 550b of the fiber optic bundles 530a and 530b, respectively, are physically apart from each other such that there is enough space for logic circuits and bond pads (not shown) around the perimeters of the image sensor chips 540a and 540b.

In one embodiment, the operation of the structure 500 is similar to the operation of the structure 100 of FIG. 1. Therefore, the fiber optic bundles 420a and 420b can be collectively referred to as a CFOID 540a+540b.

Figure 6:
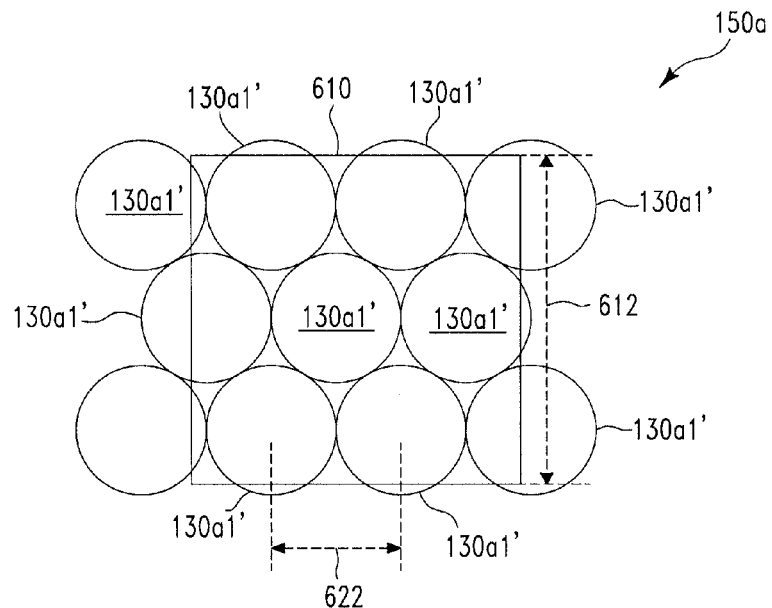
FIG. 6 illustrates a top-down view of a light output end of a fiber optic bundle of FIG. 1 and a pixel of an image sensor chip of FIG. 1, in accordance with embodiments of the present invention.

FIG. 6 illustrates a top-down view of the light output end 150a of the fiber optic bundle 130a (FIG. 1) and a pixel 610 of the image sensor chip 140a (FIG. 1), in accordance with embodiments of the present invention. In one embodiment, the pixel 610 has a shape of a square whose side 612 (which is also the pitch of the pixels of the of the image sensor chip 140a) is at least twice a pitch 622 of the fiber optic elements 130a1'. It should be noted that the pitch 622 of the fiber optic elements 130a1' is the distance between the centers of two adjacent fiber optic elements 130a1'.

With the side 612 being at least twice the pitch 622, there is no need to align the light output end 150a of the fiber optic bundle 130a to the pixels (similar to the pixel 610) of the image sensor chip 140a. In one embodiment, this size relationship between the fiber optic elements 130a1' and the pixel 610 is applicable to the structures 300, 400, and 500 of FIGS. 3, 4, and 5, respectively.

Figure 7:
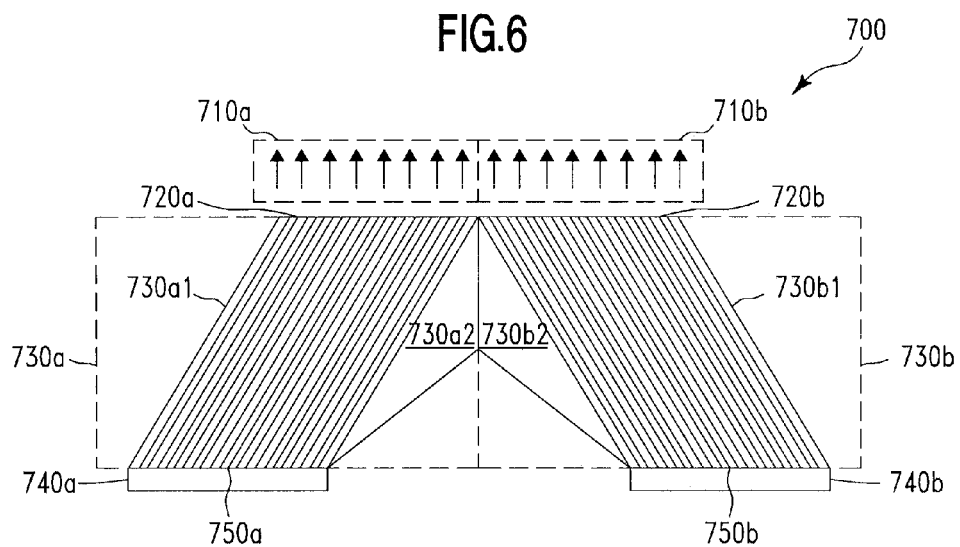
FIG. 7 shows a side view of a structure, in accordance with embodiments of the present invention.

FIG. 7 shows a side view of a structure 700, in accordance with embodiments of the present invention. More specifically, in one embodiment, with reference to FIG. 7, the structure 700 comprises (i) two fiber optic bundles 730a and 730b and (ii) two image display chips 740a and 740b. Illustratively, the fiber optic bundles 730a and 730b have structures similar to the structures of the fiber optic bundles 130a and 130b of FIG. 1, respectively. In one embodiment, the fiber optic bundles 730a and 730b are held together in a manner similar to the manner in which the fiber optic bundles 130a and 130b are held together. Illustratively, the image display chips 740a and 740b are placed in close proximity to light input ends 750a and 750b, respectively, meaning the light input ends 750a and 750b would receive essentially all of light emitting from the image display chips 740a and 740b.

In one embodiment, the operation of the structure 700 is as follows. Illustratively, with reference to FIG. 7, the image display chip 740a displays a first half of a single image at the light input end 750a. In one embodiment, the light of the first half of the image goes through a first light guide portion 730a1 to a light output end 720a. It should be noted that a first support portion 730a2 does not transmit any portion of the light of the first half of the image through it from the light input end 750a. Then, the light of the first half of the image exits the light output end 720a as a light 710a.

Similarly, the image display chip 740b displays a second half of the single image at the light input end 750b. In one embodiment, the light of the second half of the image goes through a second light guide portion 730b1 to a light output end 720b. It should be noted that a second support portion 730b2 does not transmit any portion of the light of the second half of the image through it from the light input end 750b. Then, the light of the second half of the image exits the light output end 720b as a light 710b. As a result, because the light output ends 720a and 720b are adjacent, the lights 710a and 710b represent the single image displayed by image display chips 740a and 740b. As a result, the fiber optic bundles 730a and 730b can be collectively referred to as a coherent fiber optic image combiner 730a+730b.

Figure 8:
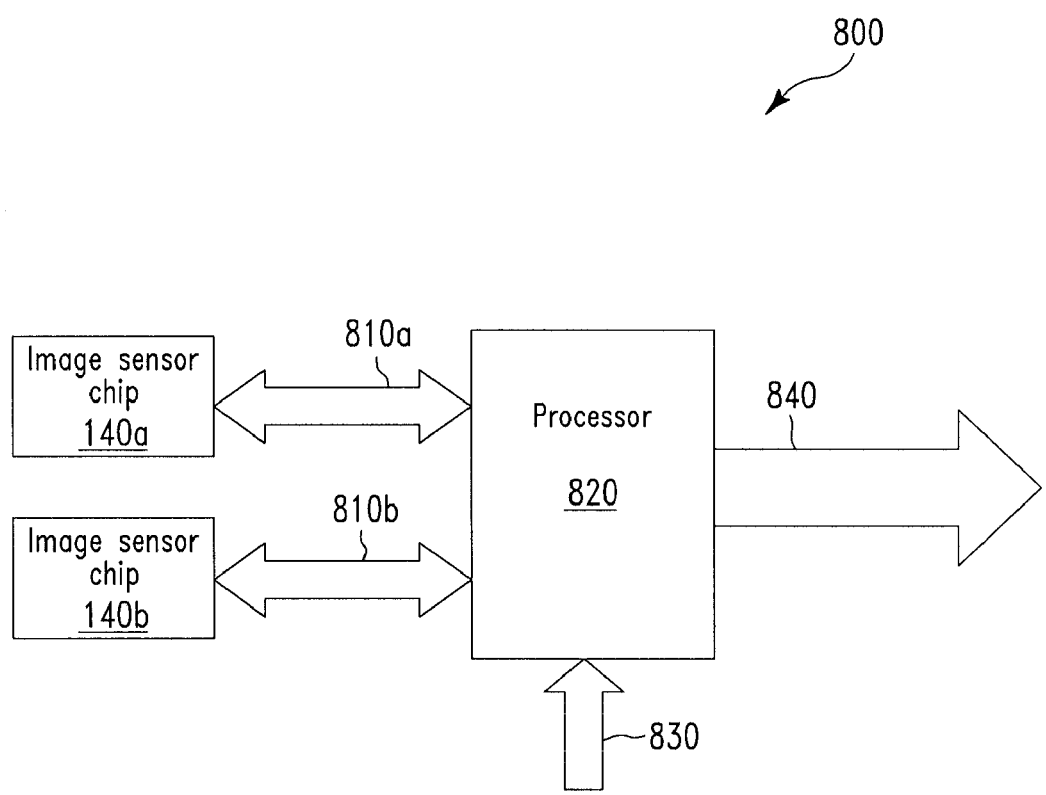
FIGS. 8 and 9 each illustrate block diagram of a system, in accordance with embodiments of the present invention.

FIG. 8 illustrates a block diagram of a system 800, in accordance with embodiments of the present invention. More specifically, in one embodiment, with reference to FIG. 8, the system 800 comprises the two image sensor chips 140a and 140b and a processor 820. Illustratively, the processor 820 receives the first digital data and the second digital data from the image sensor chips 140a and 140b through connections 810a and 810b, respectively. In one embodiment, the processor 820 also receives control signals 830 which control the operation of the processor 820. Illustratively, the processor 820 processes and combines the first digital data and the second digital data into a signal output data 840.

Figure 9:
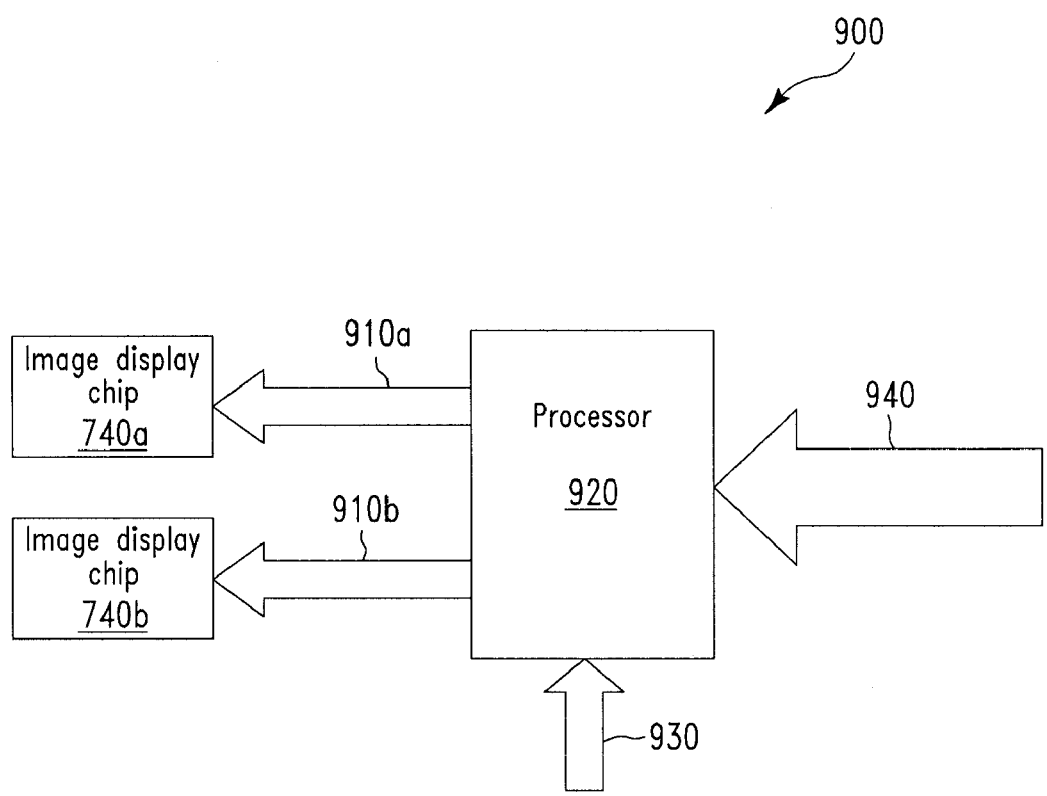

FIG. 9 illustrates a block diagram of a system 900, in accordance with embodiments of the present invention. More specifically, in one embodiment, with reference to FIG. 9, the system 900 comprises the two image display chips 740a and 740b and a processor 920.

Illustratively, the processor 920 receives the input image data 940 and outputs the first digital data (corresponding to the first half of the image) and the second digital data (corresponding to the second half of the image) to the image display chips 740a and 740b through connections 910a and 910b, respectively. In one embodiment, the processor 920 also receives control signals 930 which control the operation of the processor 920. Receiving the first and second digital data, the image display chips 740a and 740b process the first and second digital data into the first and second halves of the image and then display the first and second halves of the image to the fiber optic bundles 730a and 730b (FIG. 7), respectively, so that the entire image is displayed at the light output ends 720a and 720b (FIG. 7) as a single image.

In the embodiments described above, the number of fiber optic bundles used are two (FIG. 1), four (FIG. 3), etc. In general, a CFOID can have N fiber optic bundles wherein N is an integer greater than 1.

It should be noted that the term "light" used in this application including the claims has the same meaning as photons.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. An apparatus, comprising:
(a) N light guide portions, wherein N is an integer greater than 1, wherein each light guide portion of the N light guide portions comprises a first light guide end and a second light guide end, wherein if a single image is split into N sub images that respectively enter the N light guide portions and exit through the N first light guide ends, then the N sub images go through the respective N light guide portions and exits through the N second light guide ends undistorted;
(b) N image sensor chips, wherein the N image sensor chips are in one-to-one sufficiently close proximity to the N second light guide ends that if the N sub images respectively exit the N light guide portions through the N second light guide ends, then the N sub images respectively completely enter the N image sensor chips, and wherein the N image sensor chips are configured to collect the N sub images and subsequently convert the N sub images into N corresponding digital data; and
(c) a processor configured to combine the N corresponding digital data into a single output data,
wherein each light guide portion of the N light guide portions comprises multiple fiber optic elements,
wherein each fiber optic element of the multiple fiber optic elements comprises a first element end at the first light guide end and a second element end at the second light guide end of the respective light guide portion,
wherein each fiber optic element of the multiple fiber optic elements comprises a core and a cladding,
wherein the core comprises a first material,
wherein the cladding comprises a second material,
wherein the second material has a lower index of reflectivity than the first material, and
wherein a pitch of pixels of the N image sensor chips is at least twice a pitch of fiber optic elements of the N light guide portions.

2. The apparatus of claim 1, wherein fiber optic elements of the N light guide portions are bonded tightly and aligned with one another so as to transmit an image undistorted.

3. The apparatus of claim 1,
wherein the multiple fiber optic elements are straight, and
wherein the multiple fiber optic elements are perpendicular to the second light guide end of the respective light guide portion.

4. The apparatus of claim 1,
wherein the multiple fiber optic elements are curved, and
wherein an orientation of each fiber optic element of the multiple fiber optic elements at its first element end is perpendicular to the first light guide end of the respective light guide portion.

5. The apparatus of claim 4, wherein an orientation of each fiber optic element of the multiple fiber optic elements at its second element end is perpendicular to the second light guide end of the respective light guide portion.

6. The apparatus of claim 1, further comprising N support portions,
wherein the N support portions are in one-to-one direct physical contact with the N light guide portions,
wherein the N support portions are in direct physical contact with one another, and
wherein if an image enters the N light guide portions through the N first light guide ends, then no portion of the image transmits through the N support portions.

7. The apparatus of claim 1, wherein the N first light guide ends are adjacent to one another.

8. The apparatus of claim 7, wherein the N first light guide ends are coplanar.

9. The apparatus of claim 8, wherein for each light guide portion of the N light guide portions, the first light guide end and the second light guide end of the light guide portion are in parallel planes.

10. The apparatus of claim 1, wherein the N second light guide ends are coplanar.

11. The apparatus of claim 1, wherein the N second light guide ends are not coplanar.

12. The apparatus of claim 1, wherein N=2.

13. The apparatus of claim 1, wherein N=4.

14. An apparatus operation method, comprising:
providing an apparatus which includes
(a) N light guide portions, wherein N is an integer greater than 1, wherein each light guide portion of the N light guide portions comprises a first light guide end and a second light guide end, wherein if a single image is split into N sub images that respectively enter the N light guide portions and exit through the N first light guide ends, then the N sub images go through the respective N light guide portions and exits through the N second light guide ends undistorted;
(b) N image sensor chips, wherein the N image sensor chips are in one-to-one sufficiently close proximity to the N second light guide ends that if the N sub images respectively exit the N light guide portions through the N second light guide ends, then the N sub images respectively completely enter the N image sensor chips;
sending a the single image to the N first light guide ends;
splitting the single image into the N sub images which respectively enter the N light guide portions and exit through the N second light guide ends undistorted;
transmitting the N sub images exiting through the N second light guide ends to the N image sensor chips;
said N image sensor chips collecting and converting the N sub images to N corresponding digital data; and
a processor combining the N corresponding digital data into a single output data,
wherein each light guide portion of the N light guide portions comprises multiple fiber optic elements,
wherein each fiber optic element of the multiple fiber optic elements comprises a first element end at the first light guide end and a second element end at the second light guide end of the respective light guide portion,
wherein each fiber optic element of the multiple fiber optic elements comprises a core and a cladding,
wherein the core comprises a first material,
wherein the cladding comprises a second material,
wherein the second material has a lower index of reflectivity than the first material, and
wherein a pitch of pixels of the N image sensor chips is at least twice a pitch of fiber optic elements of the N light guide portions.

15. The apparatus operation method of claim 14, wherein N=2.

16. The apparatus operation method of claim 14, wherein N=4.

* * * * *